(12) United States Patent
Gheorghioiu et al.

(10) Patent No.: US 7,519,610 B2
(45) Date of Patent: Apr. 14, 2009

(54) METHOD AND APPARATUS FOR EFFICIENTLY STORING AUDIT EVENT DATA HAVING DIVERSE CHARACTERISTICS USING TIERED TABLES

(75) Inventors: Ovidiu Gheorghioiu, Mountain View, CA (US); Christian Lita, Austin, TX (US); Karthikeyan Ramamoorthy, Austin, TX (US); Jayashree Ramanathan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 11/560,120

(22) Filed: Nov. 15, 2006

(65) Prior Publication Data

US 2008/0114817 A1    May 15, 2008

(51) Int. Cl.
 *G06F 17/00*    (2006.01)
(52) U.S. Cl. .................................. 707/101; 707/104.1
(58) Field of Classification Search .................. 707/100, 707/101
 See application file for complete search history.

(56) References Cited

U.S. PATENT DOCUMENTS

| | | | |
|---|---|---|---|
| 5,237,675 A | 8/1993 | Hannon, Jr. | |
| 5,649,151 A | 7/1997 | Chu et al. | |
| 6,449,689 B1 | 9/2002 | Corcoran et al. | |
| 6,879,266 B1 * | 4/2005 | Dye et al. | 341/51 |
| 7,051,152 B1 | 5/2006 | Danilak | |
| 2001/0054131 A1 | 12/2001 | Alvarez, II et al. | |
| 2004/0255045 A1 * | 12/2004 | Lim et al. | 709/245 |
| 2006/0010002 A1 | 1/2006 | Kunde et al. | |
| 2006/0106986 A1 | 5/2006 | Bacon et al. | |
| 2006/0143238 A1 * | 6/2006 | Tamatsu | 707/200 |

* cited by examiner

*Primary Examiner*—Uyen T. Le
(74) *Attorney, Agent, or Firm*—Yee & Associates, P.C.; Jeffrey S. LaBaw

(57) ABSTRACT

A computer implemented method, apparatus, and computer usable program code for processing event data. In response to receiving an event, a size of the event data for the event is compared to a threshold size to form a comparison. The information about an event and event data is stored in a first entry in a main table in a database if the comparison indicates that the size of the event data is one that can be stored in the main table. The information about the event is placed in the first entry in the main table if the size is greater than the threshold size. The event data is stored in a second entry in an overflow table if the size is greater than the threshold size, wherein the entry includes a pointer to the first entry. The main table and overflow table form a live set and hold the current live data.

20 Claims, 5 Drawing Sheets

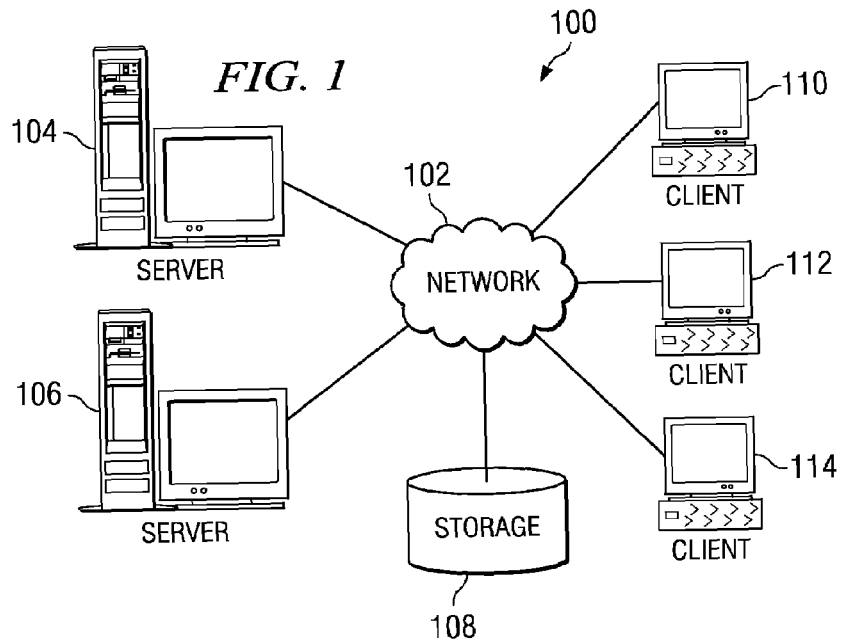

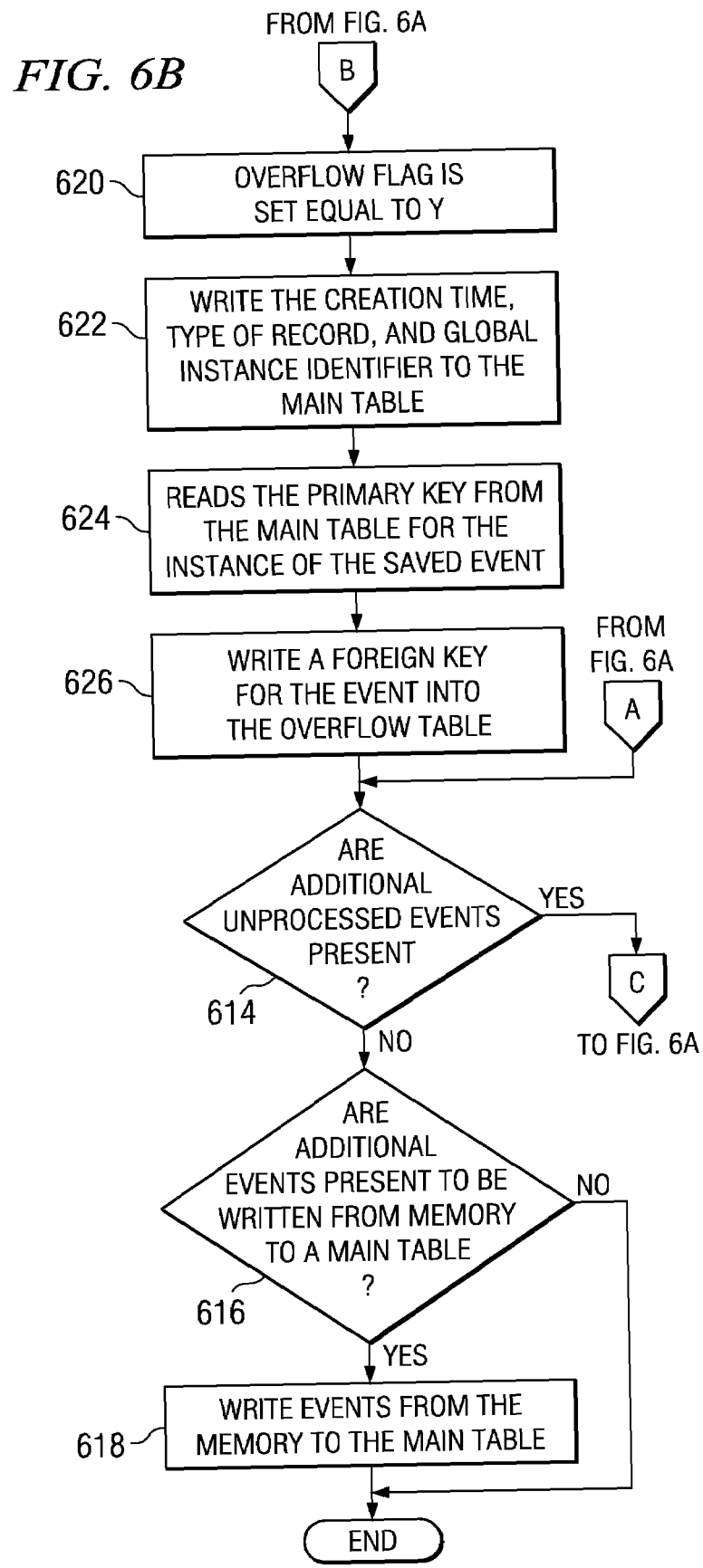

US 7,519,610 B2

METHOD AND APPARATUS FOR EFFICIENTLY STORING AUDIT EVENT DATA HAVING DIVERSE CHARACTERISTICS USING TIERED TABLES

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer useable program code for storing audit events.

2. Description of the Related Art

Businesses often have to provide information to show compliance with different government regulations. These regulations include, for example, the Sarbanes-Oxley (SOX) Act, the Health Insurance Portability and Accountability Act (HIPAA), and the Base II International Banking Code. Oftentimes, compliance with these and other regulations may be shown using information contained in audit logs maintained by information technology (IT) organizations. For compliance reasons, these audit logs often are maintained for years.

Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken.

Audit logs are typically made available in relational databases to allow easy querying of the information by reporting programs or software to generate operational and trend reports. A trend report provides summarized audit data that allows an assessment of whether long term rises or falls in questionable activity has occurred. This type of report can help provide a "security pulse" for an organization. Operational audit reports detailed review of data to determine a cause of the security incident.

Based on how audit data is used, the management of audit data has a number of different requirements. For example, audit data often has to be collected and stored in large amounts for long periods of time.

Audit data may be archived for a long period of time, such as months or years, with archival scheduled on a regular basis. With this data, trend and operational reports may be produced on recent and archived audit data. Further, data may need to be used periodically for trend and operational audit reports. These reports may be generated on a daily or weekly basis depending on the particular organization and implementation. These types of reports may be produced by customers of the information technology organization using their reporting tool of choice.

Also, a process should be included that is tamper resistant, such that audit data may be secure when it is generated, transferred, and stored. Additionally, an ability to review audit logs for critical activities that occurred in the past also are important. For example, it may be desirable to determine what a selected user did one month prior to the current time period. Further, with these large amounts of data and the time periods for which they are kept, the collecting and pruning of audit logs should be configurable to take into account changes in configuration and policy for collecting and pruning this type of information.

Currently available audit storage systems encounter difficulties based on the large amount of data that has to be stored for a long period of time. Oftentimes, millions of records may be present that are required to be stored for years. Storing and querying this type of data is often difficult and unwieldy with currently used database management systems.

SUMMARY OF THE INVENTION

The illustrative embodiments provide a computer implemented method, apparatus, and computer usable program code for processing event data. In response to receiving an event, a size of the event data for the event is compared to a threshold size to form a comparison. The information about an event and event data is stored in a first entry in a main table in a database if the comparison indicates that the size of the event data is one that can be stored in the main table. The information about the event is placed in the first entry in the main table if the size is greater than the threshold size. The event data is stored in a second entry in an overflow table if the size is greater than the threshold size, wherein the entry includes a pointer to the first entry. The main table and overflow table form a live set and hold the current live data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

FIGS. 6A and 6B are flowcharts of a process for storing event data in accordance with an illustrative embodiment;

DETAILED DESCRIPTION OF THE PREFERRED EMBODIMENT

Figure 3:
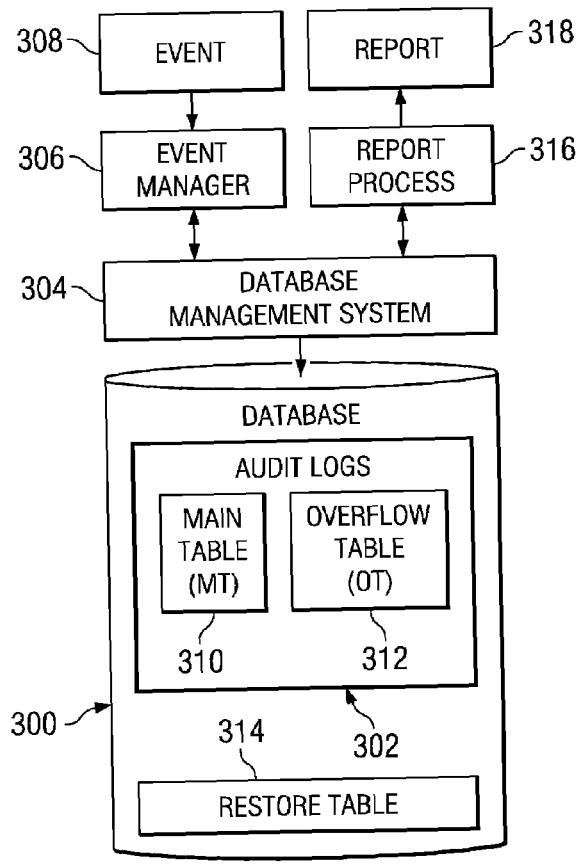
FIG. 3 is a diagram illustrating components used for processing audit events in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Turning next to FIG. 3, a diagram illustrating components used for processing audit events is depicted in accordance with an illustrative embodiment. In this example, database 300 contains audit logs 302. An audit log is a chronological sequence of audit records. Each audit record contains data pertaining to and resulting from the execution of a process, such as a business process or a network system function. Audit records typically result from activities such as transactions or communications by individual users, systems, accounts, or other entities. An audit record may show, for example, who has accessed a computer system or network resource and what operations that user has performed during a given period of time. An audit record also may show a business transaction, such as a transfer of funds from one account to another account. Access to and management of database 300 is performed through database management system (DBMS) 304.

Event manager 306 receives events, such as event 308 and sends this event to database management system 304 for storage within audit logs 302 in database 300. In the illustrative examples, audit logs 302 are comprised of tables with entries or records of stored events, such as event 308.

In the depicted examples, audit logs 302 include tables, such as main table (MT) 310 and overflow table (OT) 312. Further, restore table 314 also is used within database 300 to store event data that is to be queried for reporting. This event data may be obtained from previously saved archives. In these illustrative examples, report process 316 is used to generate reports, such as report 318 based on the information placed into restore table 314.

Report process 316 may take various forms. For example, report process 316 may be implemented using DB2 Alphablox, which is a product available from International Business Machines Corporation. Another example of a product that may be used to implement report process 316 is Crystal Reports, which is a product available from Business Objects, SA.

When event manager 306 receives event 308, event manager 306 may optionally compress the event data in event 308. In these examples, event 308 is received in the form of an extensible markup language (XML) file. Any compression system that can compress ASCII data may be used to compress event data in event 308.

Event manager 306 then determines whether a size of the event data in the event 308 is less than or equal to allocated space for event data in main table 310. This determination may be made by comparing the size of event data for event 308 to a threshold value. Each entry in main table 310 includes a number of different fields. One field, in these examples, stores event data. The size of this field for the event data in main table 310 is fixed when main table 310 is created.

Thus, if the event data is greater than the size of the field, event manager 306 then stores the event data in overflow table 312 in these illustrative examples. In this manner, the different embodiments allow for storing of event data that may vary widely in size without having design main table 310 to take into account the largest size of data that might be expected.

The different embodiments recognize that creating a field size for event data to hold the largest possible event data that may occur is uneconomical in terms of space usage within database 300. With the use of overflow table 312, the field size for event data in main table 310 may be selected based on other factors other than what might be the largest size of event data.

In the illustrative examples, the size of the field for event data may be selected using a number of different criteria. The criteria may be for example, the most common size for event data, an average size of event data, or a largest size for 90 percent of the event data. The sizes for these and other criteria may be identified using a number of different mechanisms.

For example, through trial and error or through processing events over a period of time, a common size or most commonly encountered size of event data may be identified. This common size may be used to set the size of the field for event data when creating main table 310. For example, if most event data encountered in received events is 4 KB in size, it is wasteful to allocate 32 KB of space in a field for event data for each entry in main table 310. With this example, the field for storing event data is set to 4 KB. As a result, event data having larger sizes than 4 KB are stored in overflow table 312 instead.

In these examples, when data is to be stored in overflow table 312, an entry is created in main table 310 in which other data, such as attributes about the event, are stored in this table. The actual event data is stored in a record or entry in overflow table 312. This entry in overflow table 312 has a pointer back to the entry in main table 310.

Figure 4:
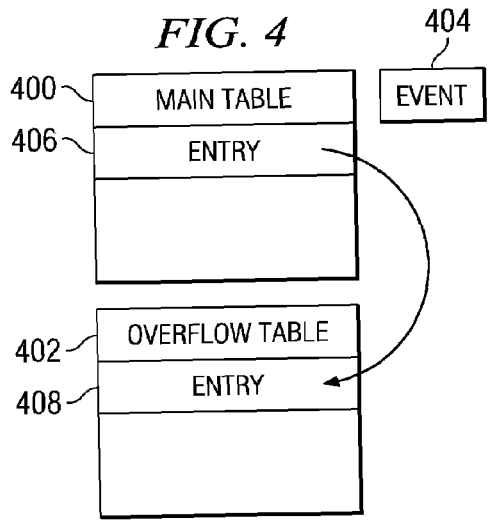
FIG. 4 is a diagram illustrating entries in a main table and in an overflow table in accordance with an illustrative embodiment.

Turning now to FIG. 4, a diagram illustrating entries in a main table and in an overflow table are depicted in accordance with an illustrative embodiment. In this example, main table 400 is an example of main table 310 in FIG. 3 while overflow table 402 is an example of overflow table 312 in FIG. 3.

In this particular example, event 404 has event data with a size greater than that allocated for event data in main table 400. Entry 406 is created with attributes about event 404. These attributes may include for example, the time the event occurred and a record type. This information is stored in entry 406 along with a flag indicating that event data for event 404 is stored within overflow table 402.

An entry, such as entry 408 is created in overflow table 402 and the event data for event 404 is stored in this entry. Additionally, entry 408 also includes a pointer back to entry 406 in main table 400. This pointer is also referred to as a foreign key and is in essence a record identifier for entry 406. In this manner, when entry 406 is accessed at a later point in time, the event data in entry 408 also may be accessed by using the record identifier from entry 406 to identify entry 408.

Figure 5:
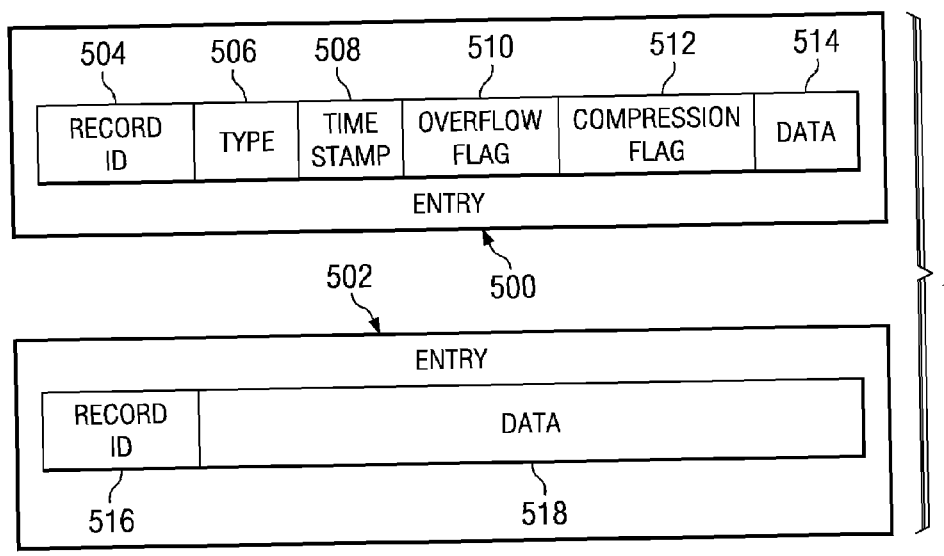
FIG. 5 is a diagram illustrating entries in accordance with an illustrative embodiment.

Turning now to FIG. 5, a diagram illustrating entries is depicted in accordance with an illustrative embodiment. Entry 500 is an example of an entry in a main table, such as entry 406 in FIG. 4. Entry 502 is an example of an entry in an overflow table, such as entry 408 in FIG. 4.

Entry 500 contains record ID 504, type 506, time stamp 508, overflow flag 510, compression flag 512, and data 514. Record ID 504 is an identifier used to locate entry 500. In these examples, record identifier 504 takes the form of a global instance identifier, which in these examples, is a string of 32 to 64 characters that uniquely identifies the event in the database. This record identifier is also referred to a primary key in these examples.

Type 506 is a field that identifies the type of record. The type of record varies depending on the environment from which an event originates. For example, with Tivoli Access Manager for e-business v6.0, event types are, for example, authentication, management of resources, security policies, users, groups, and configuration, authorization, runtime operations for security servers, resource access events, and user self-care password change operations. Tivoli Access Manager for e-business v6.0 is a product available from International Business Machines Corporation. In Tivoli Federated Identify Manager v.6.1, examples of record types include authentication, federation, trust, management operations for security policy, signing, and encryption. Tivoli Federated Identify Manager v.6.1 is a product available from International Business Machines Corporation. The event types may be identified from the events received for storage in an audit log.

Time stamp 508 is an identification of the creation time of the event. Overflow flag 510 is a field that is used to identify whether data is located in an entry, such as entry 502 in an overflow table rather than in entry 500. Compression flag 512 indicates whether event data in data 514 is in a compressed format. This flag also may identify the type of compression performed on event data. Data 514 is a field that contains the event data. Attributes, such as type 506 and time stamp 508 may be derived from the event data.

If the event data has a size that exceeds the space allocated in data 514, the event data may be stored in entry 502, which contains record ID 516 and data 518. Record ID 516 is an identifier of entry 502 and takes the form of a monotonically increasing sequence number in these examples. Record ID 516 serves as a foreign key which is used to locate entry 500. In essence, record ID 516 is equal to record ID 504. Data 518 contains the event data when the event data is not stored in entry 500.

Figure 6A:
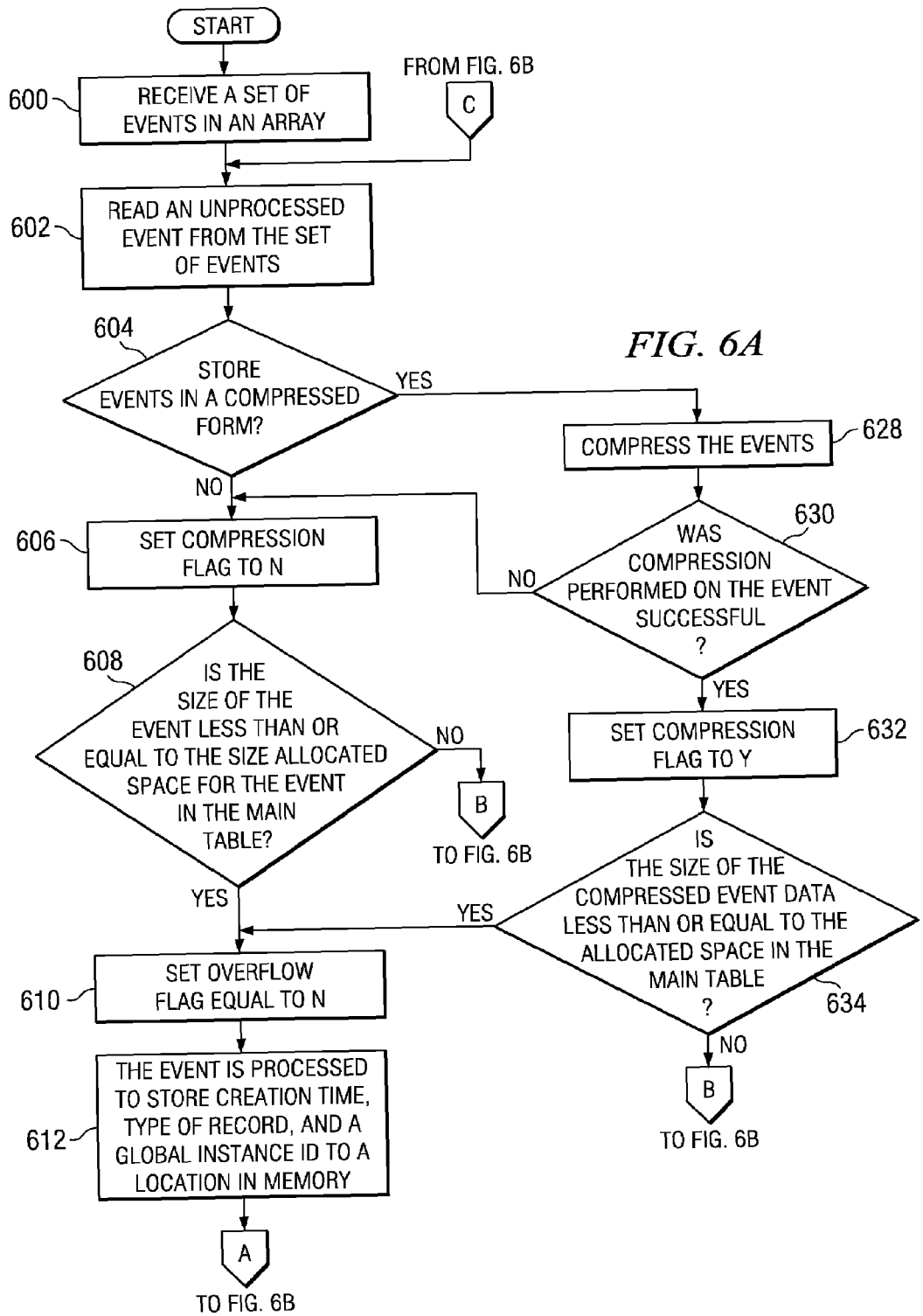

Turning now to FIGS. 6A and 6B, flowcharts of a process for storing event data is depicted in accordance with an illustrative embodiment. The process illustrated in FIGS. 6A and 6B may be implemented in a component, such as event manager 306 in FIG. 3.

The process begins by receiving a set of events in an array (step 600). The set of events is one or more events in these examples. Thereafter, the process reads an unprocessed event from the set of events (step 602). A determination is made as to whether the events are to be stored in a compressed form (step 604). This determination may be made, in these examples, through a setting selected by a user or a setting found in a configuration file. If the events are not to be stored in a compressed form, the compression flag is set equal to "N" (step 606).

Thereafter, a determination is made as to whether the size of the event is less than or equal to the size allocated space for the event in the main table (step 608). If the event data is less than or equal to allocated space, an overflow flag is set equal to "N" (step 610). Thereafter, the event is processed to store creation time, type of record, and a global instance ID to a location in memory (step 612).

Next, a determination is made as to whether additional unprocessed events are present in the array (step 614). If additional unprocessed events are present, the process returns to step 602 to read another unprocessed event as described above. Otherwise, a determination is made as to whether additional events are present to be written from memory to a main table (step 616).

If events are present, the events are written from the memory to the main table (step 618) with the process terminating thereafter. If events are not present in memory to be written to the main table in step 616, the process also terminates.

With reference again to step 608, if the size of the event is not less than or equal to the allocated space in the main table, an overflow flag is set equal to "Y" (step 620). The determination in step 608 may be made by comparing the size of the event data to a threshold value. If the threshold value is exceeded, then the size of the event is not less than or equal to the allocated space in the main table.

Thereafter, the process writes the creation time, type of record, compression/overflow flags, a database generated record_ID, which is primary key, to the main table (step 622). The process then reads the primary key from the main table for the instance of the saved event (step 624). This primary key is the record identifier in these examples.

The process then writes a foreign key for the event into the overflow table (step 626). This foreign key is the primary key read from the main table for the particular event. Thereafter, the process proceeds to step 614 as described above.

With reference again to step 604, if the events are to be stored in a compressed form, the process compresses the events (step 628). A determination is then made as to whether the compression performed on the event was successful (step 630). If the compression was not successful, the process proceeds to step 606 as described above. Otherwise, the process sets the compression flag to "Y" (step 632).

Thereafter, a determination is made as to whether the size of the compressed event data is less than or equal to the allocated space in the main table (step 634). If the size of the compressed event data is less than or equal to the allocated space, the process proceeds to step 610 as described above. Otherwise, the process proceeds to step 620.

Figure 7:
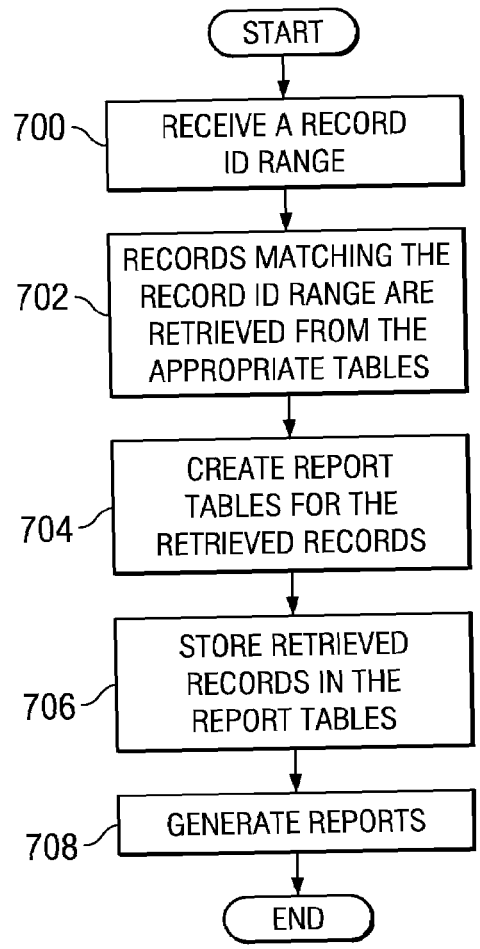
FIG. 7 is a flowchart of a process for generating reports in accordance with an illustrative embodiment.

Turning now to FIG. 7, a flowchart of a process for generating reports from live data is depicted in accordance with an illustrative embodiment. Live data is data in which new data is being modified or added. The process in FIG. 7 may be implemented in a report process, such as report process 316 in FIG. 3.

The process begins by receiving a record ID range (step 700). This record ID range lists a range of records that may be searched or queried. For example, a report may be generated for an entire month. In this instance, the range of records is for records that were created during the selected month.

Next, records matching the record ID range are retrieved from the appropriate tables (step 702). These tables may include a mixture of main tables and overflow tables. Then, a table is created for the retrieved records (step 704). In these examples, the table may be restore table 314 in FIG. 3. Step 704 may be skipped if tables have been pre-created for generating reports. Next, the retrieved records are stored in the table (step 706). Then reports are generated using the table (step 708) with the process terminating thereafter.

One advantage of using a separate table for generating reports is avoiding reading and writing to the main tables. These main tables are constantly used to store new events that are received for processing. By avoiding both reading and writing to the table, performance is increased. With this separate table, requests to access records in the main table by a report generating process are avoided.

Figure 8:
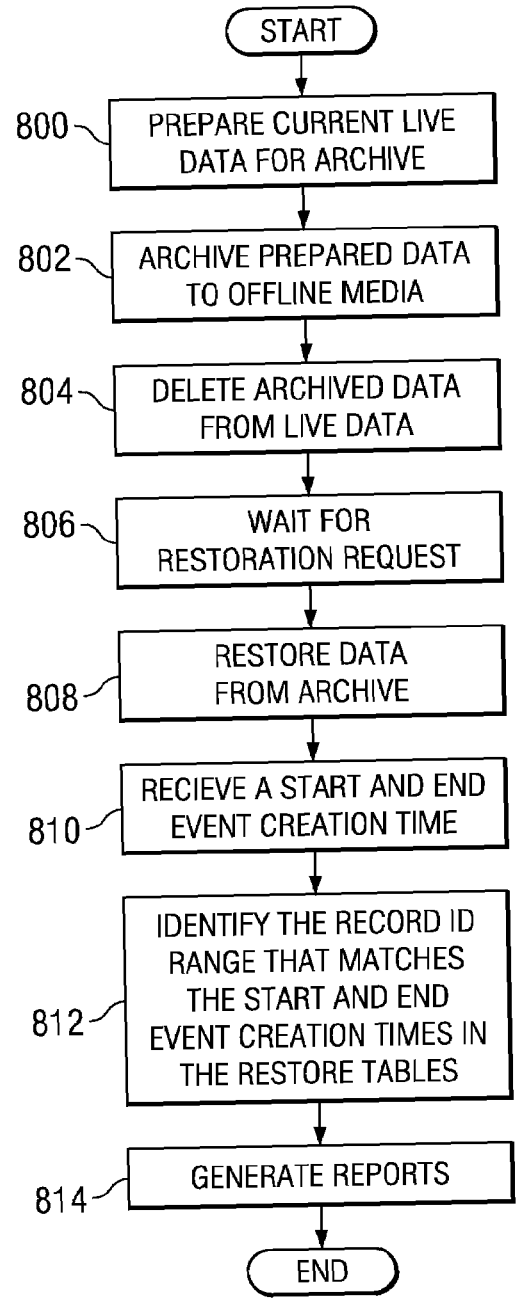
FIG. 8 is a flowchart of a process for generating reports from previously archived data in accordance with an illustrative embodiment.

Next, with reference to FIG. 8, a flowchart of a process for generating reports from previously archived data is depicted in accordance with an illustrative embodiment. The process illustrated in FIG. 8 may be implemented in a software component, such as report process 316 in FIG. 3.

The process begins by preparing current live data for archiving (step 800). During this preparation phase, a second set of main and overflow tables form the live set and start holding any new data that has arrived. Once the current main table and overflow table have been prepared for archiving data, these tables will not accept any new data.

Next, the prepared data is archived to offline media (step 802). This data may be archived to media, such as tape or optical disk. The archiving may be performed using a database provided archive tool, such as DB2 Data Archive Expert available from International Business Machines Corporation.

Thereafter, the archive data is deleted from the live data (step 804). The process then waits for a restoration request (step 806). In these examples, the request is one for data to be used to generate reports. The process then restores the data from the archive (step 808) into the restore tables.

Then, the process receives a start and end event creation time (step 810). A record identifier range is identified matching the start and end event creating times in the restore tables (step 812).

Reports are then generated using the restore data in the restore tables (step 814) with the process terminating thereafter. At this point in time, the data in the restore tables may be used to generate reports as described in FIG. 7.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing event data for each of a plurality of events that are received, the computer implemented method comprising:

responsive to receiving an event, comparing a size of the event data for the event to a threshold size to form a comparison;

storing the event data in a first entry in a main table in a database if the comparison indicates that the size of the event data is one that can be stored in the main table;

placing information about the event in the first entry in the main table if the size is greater than the threshold size; and storing the event data in a second entry in an overflow table if the size is greater than the threshold size, wherein the second entry includes a pointer to the first entry for the event in the main table.

2. The computer implemented method of claim 1, wherein the step of storing the event data in a second entry in an overflow table comprises:

storing the event data in the second entry;

creating a foreign key based on a primary key for the first entry in the main table; and storing the foreign key in the second entry in the overflow table, wherein the foreign key is the pointer to the entry in the main table.

3. The computer implemented method of claim 2, wherein the primary key is a record identifier for the first entry.

4. The computer implemented method of claim 1 further comprising:

compressing the event data prior to storing the event data.

5. The computer implemented method of claim 1, wherein the event data is in a form of data formatted using extensible markup language.

6. The computer implemented method of claim 1, wherein the placing step comprises:

placing information identifying a type of record, a time stamp, and a global instance identifier in the first entry.

7. The computer implemented method of claim 1 further comprising:

responsive to receiving a range of record identifiers, storing a copy of entries corresponding to the range of record identifiers from the main table and the overflow table in a report table; and generating a report using the copy of the entries, wherein performance in writing new entries to the main table are unaffected by generating the report.

8. The computer implemented method of claim 7, wherein the copy is stored in a restore table.

9. The computer implemented method of claim 1, wherein the computer implemented method is located in an event manager process that interacts with a database management system.

10. A computer program product comprising:

a computer usable medium having computer usable program code for processing event data for each of a plurality of events that are received, the computer program medium comprising:

computer usable program code, responsive to receiving an event, for comparing a size of the event data for the event to a threshold size to form a comparison;

computer usable program code for storing the event data in a first entry in a main table in a database if the comparison indicates that the size of the event data is one that can be stored in the main table;

computer usable program code for placing information about the event in the first entry in the main table if the size is greater than the threshold size; and computer usable program code for storing the event data in a second entry in an overflow table if the size is greater than the threshold size, wherein the second entry includes a pointer to the first entry for the event in the main table.

11. The computer program product of claim 10, wherein the computer usable program code for storing the event data in a second entry in an overflow table if the size is greater than the threshold size, and wherein the entry includes a pointer to the first entry for the event in the main table comprises:
   computer usable program code for storing the event data in the second entry;
   computer usable program code for creating a foreign key based on a primary key for the first entry in the main table; and
   computer usable program code for storing the foreign key in the second entry in the overflow table, wherein the foreign key is the pointer to the first entry in the main table.

12. The computer program product of claim 11, wherein the primary key is a record identifier for the first entry.

13. The computer program product of claim 10 further comprising:
   computer usable program code for compressing the event data prior to storing the event data.

14. The computer program product method of claim 10, wherein the event data is in a form of data formatted using extensible markup language.

15. The computer program product of claim 10, wherein the computer usable program code for placing information about the event in the first entry in the main table if the size is greater than the threshold size comprises:
   computer usable program code for placing information identifying a type of record, a time stamp, and a global instance identifier in the first entry.

16. The computer program product of claim 10 further comprising:
   computer usable program code, responsive to receiving a range of record identifiers, for storing a copy of entries corresponding to the range of record identifiers from the main table and the overflow table in a report table; and
   computer usable program code for generating a report using the copy of the entries, wherein performance in writing new entries to the main table are unaffected by generating the report.

17. A data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to compare in response to receiving an event having event data, a size of the event data for the event to a threshold size to form a comparison; store the event data in a first entry in a main table in a database if the comparison indicates that the size of the event data is one that can be stored in the main table; place information about the event in the first entry in the main table if the size is greater than the threshold size; and store the event data in a second entry in an overflow table if the size is greater than the threshold size, wherein the second entry includes a pointer to the first entry.

18. The data processing system of claim 17, wherein in executing the computer usable program code to store the event data in a second entry in an overflow table if the size is greater than the threshold size, wherein the entry includes a pointer to the first entry the processor executes the computer usable program code to store the event data in the second entry; create a foreign key based on a primary key for the first entry; and store the foreign key in the second entry, wherein the foreign key is the pointer to the first entry.

19. The data processing system of claim 18, wherein the primary key is a record identifier for the first entry.

20. The data processing system of claim 17 wherein the processor unit further executes the computer usable program code to compress the event data prior to storing the event data.

* * * * *